March 6, 1956  C. M. TURSKY  2,737,299
FUEL OIL FILTERS
Filed March 9, 1951
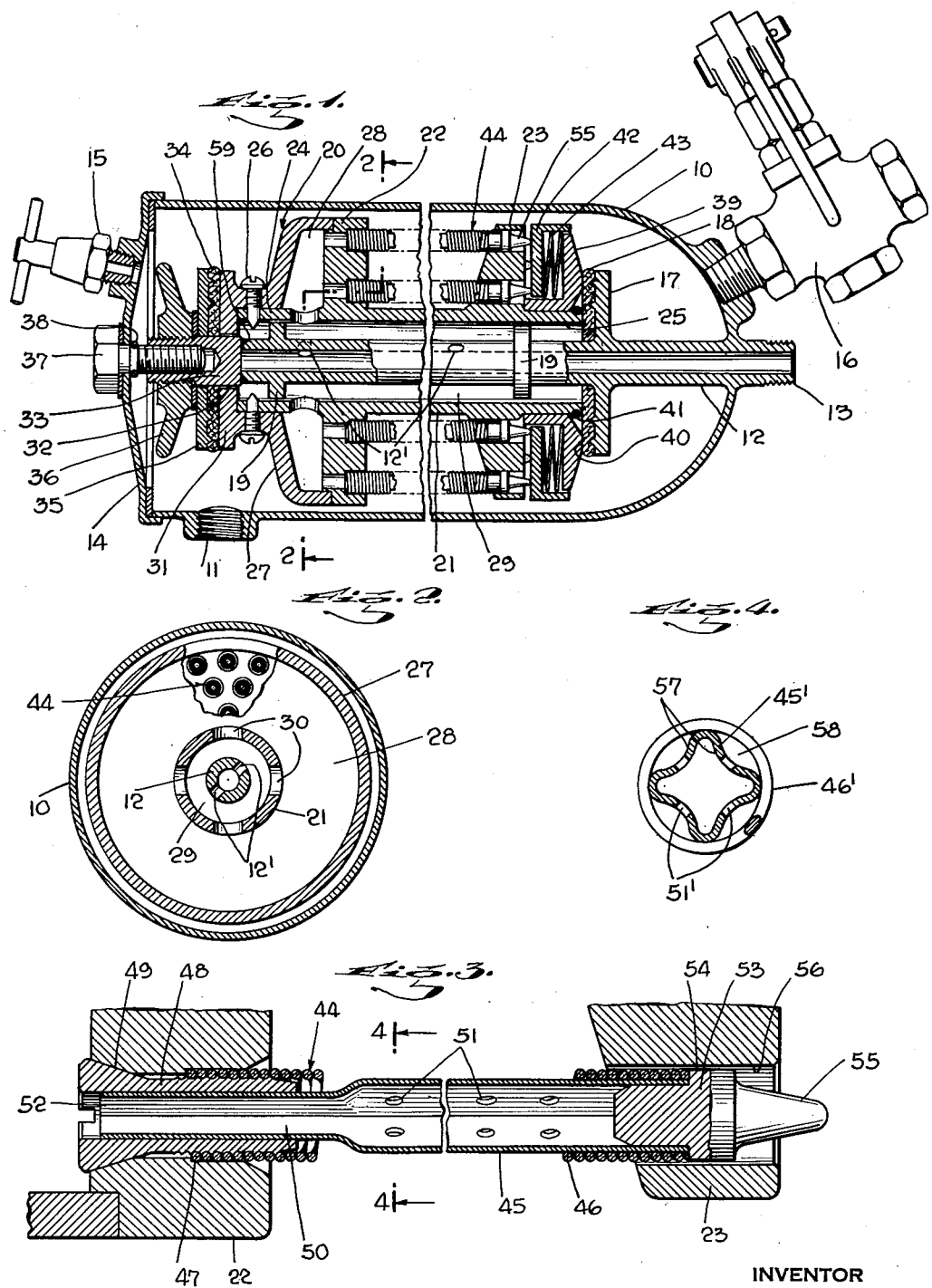
INVENTOR
CHARLES M. TURSKY
BY
*Howard P. Thompson*
ATTORNEY United States Patent Office 2,737,299
Patented Mar. 6, 1956

2,737,299

FUEL OIL FILTERS

Charles M. Tursky, Neshanic, N. J.

Application March 9, 1951, Serial No. 214,737

5 Claims. (Cl. 210—184)

This invention relates to filters for use in filtering fuel oil for supply to diesel engines and which can be utilized for filtering fluids of any type or kind. More particularly, the invention deals with a filter unit which is mounted in a casing, or housing, and detachable as a unit through one end thereof for repair or replacement. Still more particularly, the invention deals with a filter unit, wherein the fluid is filtered through a multiplicity of coil-like filter elements encircling perforated tubes in producing a large filter area for the fluid and in transmitting the filtered fluid to a central discharge tube of the casing or housing.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a longitudinal sectional view through a filter tank, showing one of my improved units mounted therein, part of the construction being broken away and parts being omitted for sake of clarity.

Fig. 2 is a broken section on the line 2—2 of Fig. 1 and showing only a few of the filter elements.

Fig. 3 is an enlarged longitudinal section through one of the filter units, completing detail of mounting of one end of the unit which is not shown in Fig. 1, with parts of the construction broken away and parts shown in elevation; and Fig. 4 is a section on the line 4—4 of Fig. 3, showing a modified form of circulating tube which I employ.

In Fig. 1 of the drawing, I have shown at 10 a casing, or housing, of a filter of the general type and kind used on naval diesel engines, the casing 10 having a fuel oil inlet at 11 and an axial tubular discharge 12, which extends the major portion of the length of the casing and has a protruding outlet end 13. At 14 is shown a detachable cover plate closing the open end of the casing and in this plate is mounted a plug 15. Mounted on the outlet end of the casing is a valve 16, which facilitates circulation of a filter cleaning fluid in reverse passage through the filter, the inlet end, as at 11, being shut off by suitable valve means, not shown, in this operation.

The discharge tube 12 has, within the casing 10 adjacent the outlet end thereof, a large flange or ring 17, having a packing facing 18. The tube 12 also has collars, as at 19, in guiding the filter unit 20 in its assemblage into the casing 10 and abutting the packing 18.

The unit 20 comprises a center tubular body 21, having annular plate portions 22 and 23, inwardly of the ends 24 and 25 thereof. Mounted on the end 24 by a series of pin end screws 26 is what might be termed a header plate or housing 27 which, in conjunction with the plate portion 22, forms a distributor or circulating chamber 28, which communicates with the bore 29 of the tubular portion 21 through a series of ports 30, note Fig. 2.

The end wall 31 of the header 27 has an aperture 32 in which is freely mounted a plug 33. Around the plug 33 and on the face of the end wall 31 is a packing 34, against which abuts a plate 35. The plate 35 has a pressure engagement with the packing 34 by a large nut 36 in threaded engagement with the plug 33.

The cover plate 14 has a nut 37 freely rotatable therein and held against displacement therefrom by a spring ring 38 and this nut is in threaded engagement with the plug 33 and supports the end of the unit 20 within the casing 10. By loosening the nut 37, the plate 14 can be removed in removing the unit 20 from the casing. In this connection, it is understood that the nut 36 also supports the unit in pressure engagement with the packing 18 through the structure which will now be described.

Mounted on the end 25 of the tube 21 is a flanged ring 39 having an annular contracted portion 40 which is adapted to bear upon the packing 18 in sealing this end of the unit in the casing. A spring ring 41 is mounted on the end 25 to retain the ring 39 against displacement when the unit 20 is removed from the casing. Mounted on the flanged ring 39 is another flanged ring 42 between which, and the ring 39, are arranged a series of coil springs 43 for yieldable movement of the ring 42 toward and from the ring 39 in yieldably supporting a multiplicity of filter elements 44 in the unit 20. All of the filter elements 44 are of the same construction, thus the brief description of one will apply to all. These elements are mounted in and extend between the plates 22 and 23 and comprise a tube 45, around which is disposed a coil spring-like filter 46. One end of the filter 46 seats in the plate 22, as indicated at 47, note Fig. 3, and extending into the filter is a sleeve plug 48, having a tapered seat, as at 49, in the plate 22. The plug 48 fits over the reduced square end 50 of the tube 45 and is threaded to engage the end of the coil filter 46 in the mounting of all of the filter elements 44. In this connection, it will appear that the remainder of the tube is of a diameter to fit snugly, but freely, within the spring-like filter 46 and the plug 48 controls the length of the tube 45 in removing spacing between the coils of the filter 46 in controlling operation of the filter unit, as later described.

The tube 45 has a multiplicity of circulating ports 51, through which oil or other fluid to be filtered is adapted to pass in discharging the filtered fluid through the end 52 of the tube 45 into the chamber 28, and thus, into the chamber 29 through the ports 30 and out through the discharge tube 21 through a series of ports 12' in said tube, a few of which are indicated in Fig. 1 and two of which are shown in section in Fig. 2. The other end of the tube 45 has a plug 53 mounted therein, the plug being flanged, as at 54, to form a seat for the filter 44 and the plug terminates in an outwardly contracted end 55 to bear against the flange plate 42, as clearly illustrated in Fig. 1 of the drawing, the plug 53, as well as the filter 46, having free movement in a bore 56 in the plate 23. As previously stated, all of the filter elements 44 are of the same construction and, thus, it will be apparent that all of the contracted ends 55 of the plugs 53 will bear against the flange plate 42, so as to yieldably support all of the filter units and, by virtue of the adjustment provided as heretofore explained, the degree of filtration is controlled between the coils between the filters 46, as will be apparent. With my improved filter, it will be apparent that oil from a source of supply is pressure fed into the casing 10 through the inlet 11 and then passes through all of the filters 46 through the apertures 51 into the tubes 45, then out through the ends 52 of said tubes into the chamber 28 and, then, out through the discharge tube 12 in the manner previously stated.

It will be understood that the large diameter end of the tube 45 is also square in cross-sectional form, similar to the small end and this provides, within the filters 46, longitudinal passages which facilitate circulation of the filtered oil, or fluid, through the ports 51 into the tube 45.

In Fig. 4 of the drawing, I have shown a slight modification in cross-section of the tubes 45 and, in said figure, 45' represents the modified tube, which instead of being square in cross-sectional form, the normal flat sides of the tube are pressed inwardly, as seen at 57 and the apertures 51' are located in these inwardly pressed walls 57. This construction provides larger longitudinal circulating passages, as at 58, within the filter 46', than would be the case when the square tubes are employed.

In connection with circulation of the filtered fluid, it will also be understood that some of this filtered fluid will pass out through the plugs 48, around the flat sides of the reduced end 50 of the tube. With the modification shown in Fig. 4, it will be understood that the reduced end portion of the modified tube will also include the valleys, as in Fig. 4, so as to increase the area through these discharges.

The plug 33 is fixed to the end of the tube 12 by welding, as indicated at 59, thus the plug becomes an integral part of said tube and forms a binding between the unit 20 and the flange or ring 17 of the tube 12.

Having fully described my invention, what I claim as new and desire to secure by Letters Patent is:

1. A filter of the character described comprising a cylindrical casing having an open end closed by a removal cover plate, the casing having a central tubular portion having a discharge through the other end of the casing, said tubular portion having, within and adjacent said discharge end of the casing, an annular flange portion, a filter unit detachable with the casing through the open end thereof, a multiplicity of tubular coil filter elements in said unit, said unit being slidably mounted on and encircling the tubular portion of the casing, means for sealing the unit on said flange portion, said unit comprising a central tubular body having integral circumferential rings at end portions thereof, said rings forming supports for said multiplicity of filter elements extending between said rings and encircling the tubular body, one end of the unit having means outwardly of one of the rings forming a circulating chamber, with which the filter elements communicate, said tubular body forming, around said tubular portion of the casing, a fluid circulating chamber communicating with the first chamber through a plurality of ports in said tubular body, the tubular portion of the casing being apertured for transmission of the filtered fluid out through the discharge end of said tubular portion, and means between the flange of said tubular portion and the other of said rings for yieldably engaging one end portion of all of the filter elements.

2. A filter of the character described comprising a cylindrical casing having an open end closed by a removable cover plate, the casing having a central tubular portion having a discharge through the other end of the casing, said tubular portion having, within and adjacent said discharge end of the casing, an annular flange portion, a filter unit detachable with the casing through the open end thereof, a multiplicity of tubular coil filter elements in said unit, said unit being slidably mounted on and encircling the tubular portion of the casing, means for sealing the unit on said flange portion, said unit comprising a central tubular body having integral circumferential rings at end portions thereof, said rings forming supports for said multiplicity of filter elements extending between said rings and encircling the tubular body, one end of the unit having means outwardly of one of the rings forming a circulating chamber, with which the filter elements communicate, said tubular body forming around said tubular portion of the casing, a fluid circulating chamber communicating with the first chamber through a plurality of ports in said tubular body, the tubular portion of the casing being apertured for transmission of the filtered fluid out through the discharge end of said tubular portion, means between the flange of said tubular portion and the other of said rings for yieldably engaging one end portion of all of the filter elements, each filter element comprising an elongated coil having passages therethrough, an apertured tube within said filter coil, and said tube being of such cross-sectional form as to provide, within the filter coil, longitudinal circulating passages.

3. A filter of the character described comprising a cylindrical casing having an open end closed by a removable cover plate, the casing having a central tubular portion having a discharge through the other end of the casing, said tubular portion having, within and adjacent said discharge end of the casing, an annular flange portion, a filter unit detachable with the casing through the open end thereof, a multiplicity of tubular coil filter elements in said unit, said unit being slidably mounted on and encircling the tubular portion of the casing, means for sealing the unit on said flange portion, said unit comprising a central tubular body having integral circumferential rings at end portions thereof, said rings forming supports for said multiplicity of filter elements extending between said rings and encircling the tubular body, one end of the unit having means outwardly of one of the rings forming a circulating chamber, with which the filter elements communicate, said tubular body forming around said tubular portion of the casing, a fluid circulating chamber communicating with the first chamber through a plurality of ports in said tubular body, the tubular portion of the casing being apertured for transmission of the filtered fluid out through the discharge end of said tubular portion, means between the flange of said tubular portion and the other of said rings for yieldably engaging one end portion of all of the filter elements, each filter element comprising an elongated coil having passages therethrough, an apertured tube within said filter coil, said tube being of such cross-sectional form as to provide, within the filter coil, longitudinal circulating passages, and one end of said tube being reduced and mounted in the first named ring of the tubular body.

4. A filter of the character described comprising a cylindrical casing having an open end closed by a removable cover plate, the casing having a central tubular portion having a discharge through the other end of the casing, said tubular portion having, within and adjacent said discharge end of the casing, an annular flange portion, a filter unit detachable with the casing through the open end thereof, a multiplicity of tubular coil filter elements in said unit, said unit being slidably mounted on and encircling the tubular portion of the casing, means for sealing the unit on said flange portion, said unit comprising a central tubular body having integral circumferential rings at end portions thereof, said rings forming supports for said multiplicity of filter elements extending between said rings and encircling the tubular body, one end of the unit having means outwardly of one of the rings forming a circulating chamber, with which the filter elements communicate, said tubular body forming around said tubular portion of the casing, a fluid circulating chamber communicating with the first chamber through a plurality of ports in said tubular body, the tubular portion of the casing being apertured for transmission of the filtered fluid out through the discharge end of said tubular portion, means between the flange of said tubular portion and the other of said rings for yieldably engaging one end portion of all of the filter elements, each filter element comprising an elongated coil having passages therethrough, an apertured tube within said filter coil, said tube being of such cross-sectional form as to provide, within the filter coil, longitudinal circulating passages, one end of said tube being reduced and mounted in the first named ring of the tubular body, and said mounting being adjustable in said ring.

5. In filter casings of the character described, a filter unit comprising an elongated tubular body, having a pair of integral outwardly extending annular plate portions inwardly of ends thereof, means mounted on one end of the tubular body forming, in conjunction with the plate at said end, an annular distributor chamber, a multiplicity of filter elements extending between the plates of said tubular body outwardly thereof, each filter element comprising a coil filter with an apertured tube disposed within and extending longitudinally of the coil filter, said tube being of irregular cross-sectional form to provide longitudinal fluid passages within said coil, a plug closing one end of the tube, the other end of the tube opening into said distributor chamber, said plug having a contracted end protruding through the other plate of said tubular body, and means yieldably engaging the protruding end of said plug.

References Cited in the file of this patent

UNITED STATES PATENTS

| | | |
|---|---|---|
| 673,398 | Keller | May 7, 1901 |
| 1,145,372 | Krause | July 6, 1915 |
| 1,335,899 | Kahlenberg | Apr. 6, 1920 |
| 2,225,813 | Williams | Dec. 24, 1940 |
| 2,399,887 | Olson | May 7, 1946 |
| 2,430,078 | Reinsch | Nov. 4, 1947 |
| 2,487,769 | Ebert et al. | Nov. 8, 1949 |
| 2,507,125 | Townsend | May 9, 1950 |
| 2,537,897 | Hunter | Jan. 9, 1951 |
| 2,565,445 | Winslow et al. | Aug. 21, 1951 |
| 2,609,933 | Ross | Sept. 9, 1952 |